(12) United States Patent
McCoy

(10) Patent No.: US 10,959,420 B1
(45) Date of Patent: *Mar. 30, 2021

(54) SCAVENGING ANIMAL DETERRING FEEDER ASSEMBLY

(71) Applicant: Margene McCoy, Ringgold, LA (US)

(72) Inventor: Margene McCoy, Ringgold, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,471

(22) Filed: Feb. 20, 2020

(51) Int. Cl.
 A01M 29/30 (2011.01)
 A01K 5/01 (2006.01)

(52) U.S. Cl.
 CPC ............... *A01M 29/30* (2013.01); *A01K 5/01* (2013.01)

(58) Field of Classification Search
 CPC ..... A01M 29/30; A01K 5/0225; A01K 5/015; A01K 5/02; A01K 5/01
 See application file for complete search history.

(56) References Cited

U.S. PATENT DOCUMENTS

| 185,593 | A | | 12/1876 | Topliff | |
|---|---|---|---|---|---|
| 2,666,415 | A | | 1/1954 | Scruggs | |
| 2,896,575 | A | | 7/1959 | Scruggs | |
| 4,815,235 | A | * | 3/1989 | Faltinowski | A01G 13/10 52/101 |
| 5,167,099 | A | | 12/1992 | Nelson | |
| 5,528,858 | A | * | 6/1996 | Omdahl | A01G 13/10 47/32 |
| 6,622,653 | B1 | * | 9/2003 | Starnes, Jr. | A01K 5/01 119/51.01 |
| 6,684,812 | B1 | * | 2/2004 | Tucker | A01K 5/02 119/51.01 |
| 7,040,058 | B2 | | 5/2006 | Finkelstein | |
| 7,243,465 | B2 | | 7/2007 | Donoho | |
| 7,320,295 | B2 | | 1/2008 | Ehrreich | |
| D654,139 | S | | 2/2012 | Paulin | |
| 9,386,764 | B2 | | 7/2016 | Donoho | |
| 9,820,478 | B1 | * | 11/2017 | Balistreri | A01M 29/30 |
| 9,861,093 | B2 | | 1/2018 | Donoho | |
| D813,976 | S | | 3/2018 | Balistreri | |
| 2003/0005887 | A1 | * | 1/2003 | Graham | A01K 5/0225 119/52.1 |
| 2005/0081426 | A1 | * | 4/2005 | Hsia | A01G 13/105 43/124 |
| 2008/0173244 | A1 | * | 7/2008 | Welker | A01K 5/0225 119/51.01 |
| 2013/0145991 | A1 | | 6/2013 | Jackson | |
| 2015/0327510 | A1 | * | 11/2015 | Romero | A01K 7/02 119/51.11 |
| 2016/0302383 | A1 | * | 10/2016 | Frieden | A01K 5/02 |
| 2017/0055492 | A1 | * | 3/2017 | Lowenthal | A01K 5/0114 |
| 2017/0208781 | A1 | * | 7/2017 | Bogart | A01K 5/0225 |

(Continued)

*Primary Examiner* — Monica L Barlow
*Assistant Examiner* — Aaron M Rodziwicz
(74) *Attorney, Agent, or Firm* — R. Keith Harrison (57) ABSTRACT

A scavenging animal deterring feeder assembly may include a feeder support stand having an elevated stand platform and a stand fence having a plurality of spaced-apart, upward-standing fence spikes carried by the stand platform. A feed-dispensing wildlife feeder may be supported by the stand platform of the feeder support stand and at least partially enclosed by the stand fence. Accordingly, the stand fence deters a wild hog or other scavenging animal from landing its front paws onto the stand platform and collapsing the stand platform in an attempt to access the animal feed in the wildlife feeder.

19 Claims, 7 Drawing Sheets

(56) References Cited

U.S. PATENT DOCUMENTS

| | | | |
|---|---|---|---|
| 2017/0280677 A1* | 10/2017 | Young | A01K 5/0291 |
| 2017/0360002 A1* | 12/2017 | Bellow | A01K 5/0225 |
| 2018/0010340 A1* | 1/2018 | Linson | A01M 29/30 |
| 2018/0153154 A1* | 6/2018 | Cosgrover | A01K 75/00 |
| 2018/0279579 A1* | 10/2018 | Alcoser | A01M 31/002 |
| 2018/0317449 A1* | 11/2018 | Landry | A01K 5/0291 |
| 2019/0090473 A1* | 3/2019 | West | A01M 31/008 |

\* cited by examiner

SCAVENGING ANIMAL DETERRING FEEDER ASSEMBLY

FIELD

Illustrative embodiments of the disclosure generally relate to wildlife feeders for feeding wild game and other wildlife animals. More particularly, illustrative embodiments of the disclosure relate to a feeder assembly which deters wild hogs and other scavenging animals from accessing animal feed contained inside or dispensed from the feeders.

BACKGROUND

The background description provided herein is solely for the purpose of generally presenting the context of the illustrative embodiments of the disclosure. Aspects of the background description are neither expressly nor impliedly admitted as prior art against the claimed subject matter.

Wildlife feeders are commonly used to dispense particulate animal feed which attracts deer and other wild game animals for hunting, observation or other purposes. However, one of the common obstacles to using a wildlife feeder is the scavenging of the feed by wild hogs and other scavenging animals.

Accordingly, a feeder assembly which deters wild hogs and other scavenging animals from accessing animal feed contained inside or dispensed from the feeders may be desirable for some applications.

SUMMARY

Illustrative embodiments of the disclosure are generally directed to a scavenging animal deterring feeder assembly. An illustrative embodiment of the scavenging animal deterring feeder assembly may include a feeder support stand having an elevated stand platform and a stand fence having a plurality of spaced-apart, upward-standing fence spikes carried by the stand platform. A feed-dispensing wildlife feeder may be supported by the stand platform of the feeder support stand and at least partially enclosed by the stand fence. Accordingly, the stand fence deters a wild hog or other scavenging animal from raising and landing its front paws onto the stand platform and collapsing the stand platform in an attempt to access the animal feed in the wildlife feeder.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
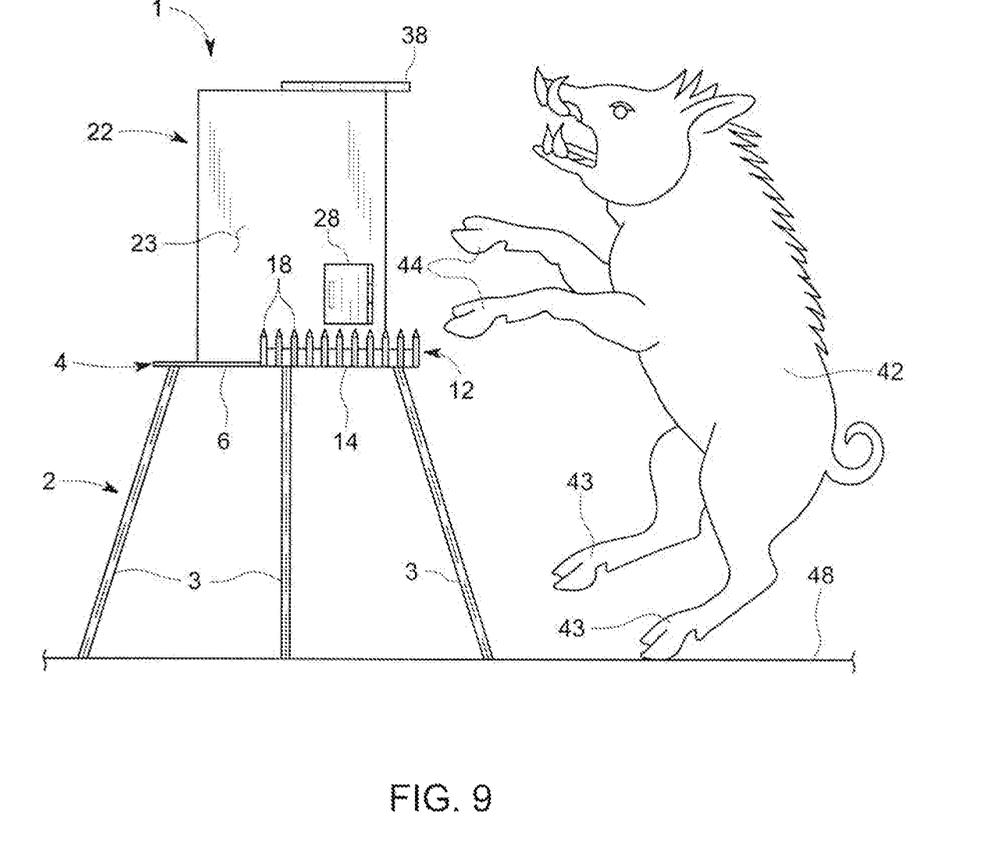
FIG. 9 is a right side view of the illustrative scavenging animal deterring feeder assembly, more particularly illustrating a scavenging animal attempting to access particulate animal feed in the wildlife feeder of the assembly in typical application of the assembly.

Referring initially to FIG. 9 of the drawings, an illustrative embodiment of the scavenging animal deterring feeder assembly, hereinafter assembly, is generally indicated by reference numeral 1. As will be hereinafter further described, the assembly 1 may be deployed on the ground or other support surface 48 in an area to which deer and/or other wildlife are to be attracted for hunting, observation or other purposes. The assembly 1 may include an elevated, feed-dispensing wildlife feeder 22 which contains a supply of animal feed 40 (FIG. 5) that is dispensed to attract the wildlife to the area in which the assembly 1 is deployed. The assembly 1 may deter a hog or other scavenging animal 42 from accessing animal feed contained in the wildlife feeder 22 for consumption.

Figure 1:
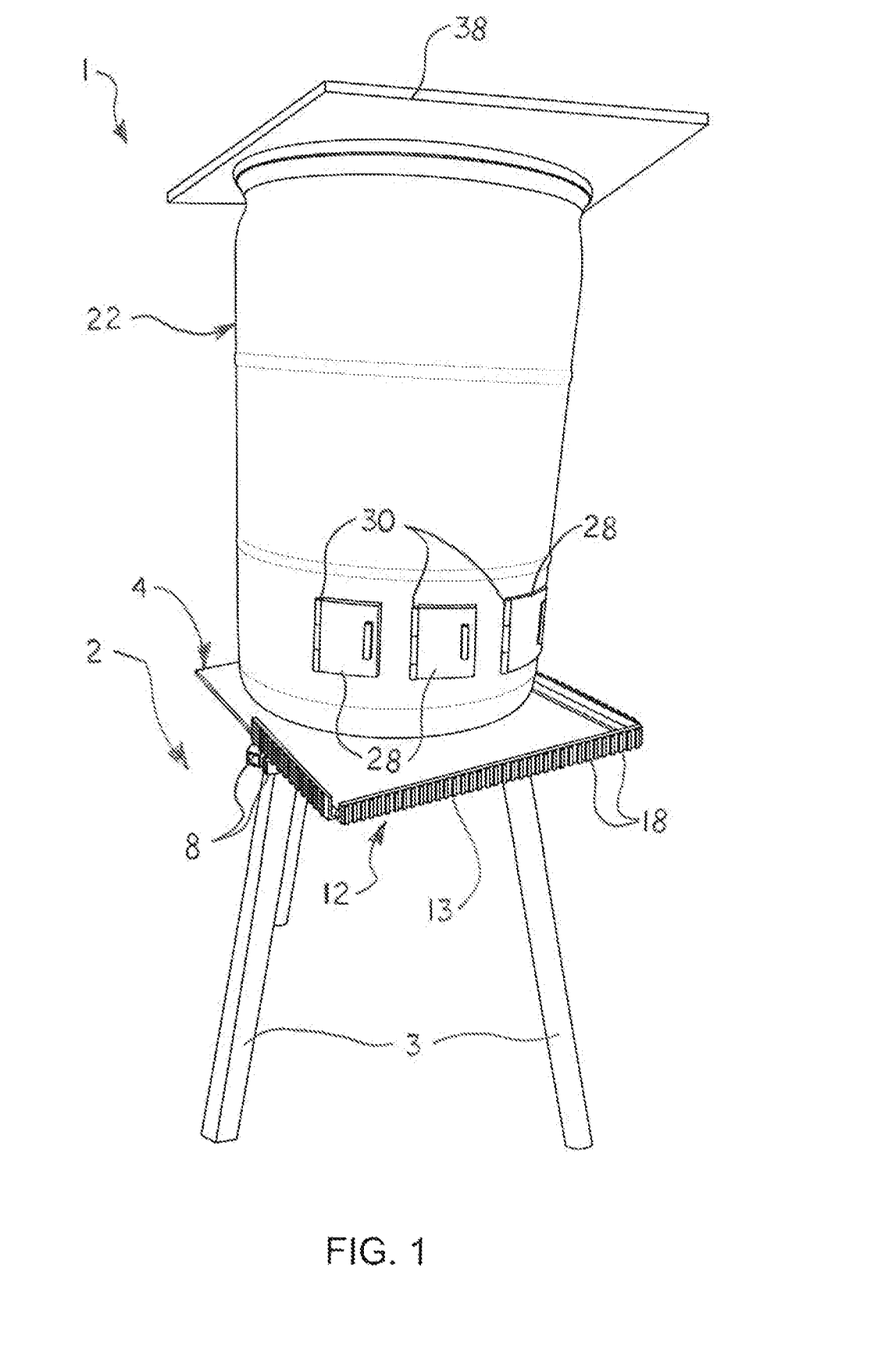
FIG. 1 is a front perspective view of an illustrative embodiment of the scavenging animal deterring feeder assembly.
Figure 2:
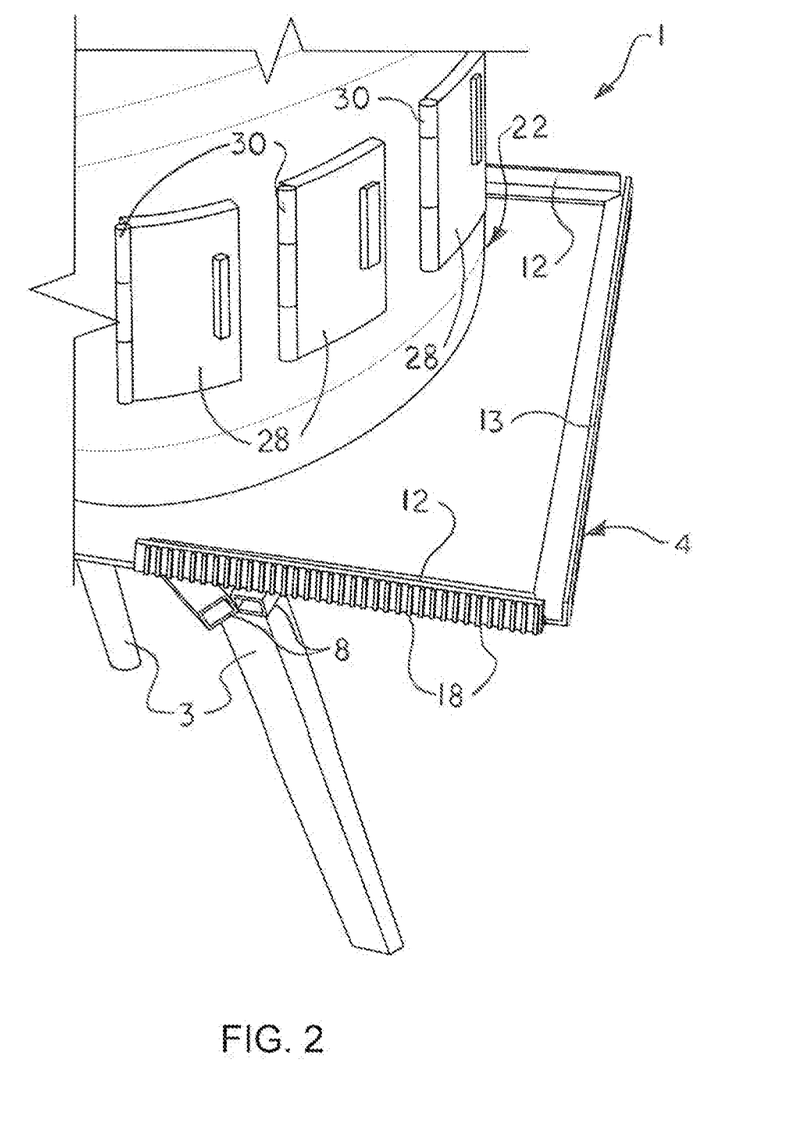
FIG. 2 is a front perspective view of a typical feeder support stand of the scavenging animal deterring feeder assembly.
Figure 3:
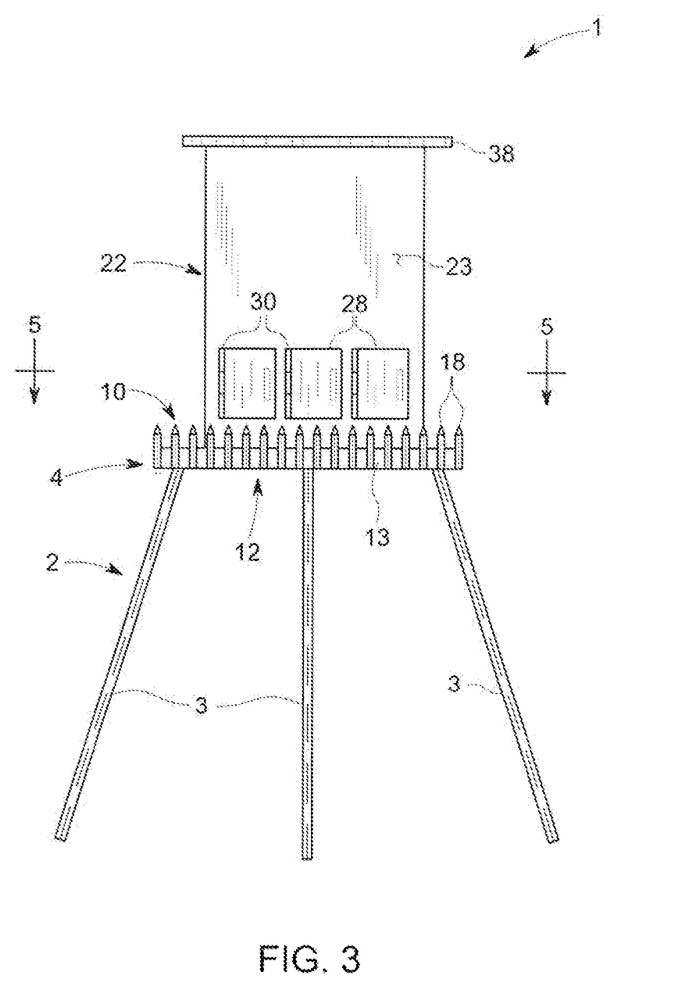
FIG. 3 is a front view of the illustrative scavenging animal deterring feeder assembly.
Figure 4:
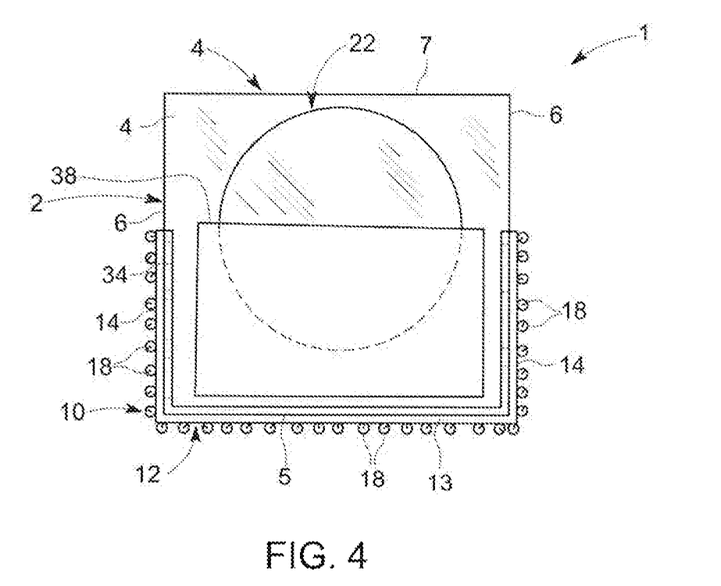
FIG. 4 is a top view of the illustrative scavenging animal deterring feeder assembly.

Referring next to FIGS. 1-8 of the drawings, the assembly 1 may include a feeder support stand 2 having an elevated stand platform 4. In some embodiments, the feeder support stand 2 may include at least one stand leg 3, and typically, a tripod arrangement of the stand legs 3, as illustrated, and the stand platform 4 may be supported by the stand legs 3. As illustrated in FIGS. 1 and 2, in some embodiments, a platform support frame 8 may be provided on the stand legs 3.

The stand platform 4 may be supported by the platform support frame 8. In some embodiments, the lengths of the stand legs 3 may be sufficient to support the stand platform 4 at a height of about 30 inches above the ground or other support surface 48 (FIG. 9) on which the assembly 1 is deployed. The stand legs 3 and the platform support frame 8 may include square tubing, for example and without limitation.

A stand fence 10 may be deployed on the stand platform 4. The stand fence 10 may include a plurality of spaced-apart, upward-standing fence spikes 18. In some embodiments, the stand fence 10 may include a fence frame 12. The fence frame 12 may include an elongated strip or segment of angled metal or other material which is suitable to provide a support structure for the fence spikes 18. The fence spikes 18 may be supported by the fence frame 12. For example and without limitation, in some embodiments, the fence spikes 18 may be welded to the fence frame 12. In other embodiments, the fence spikes 18 may be casted, molded or otherwise fabricated in one piece with the fence frame 12. In still other embodiments, the fence spikes 18 may be attached to the fence frame 12 using screws, clips, clamps, brackets and/or mechanical fasteners known by those skilled in the art.

Figure 5:
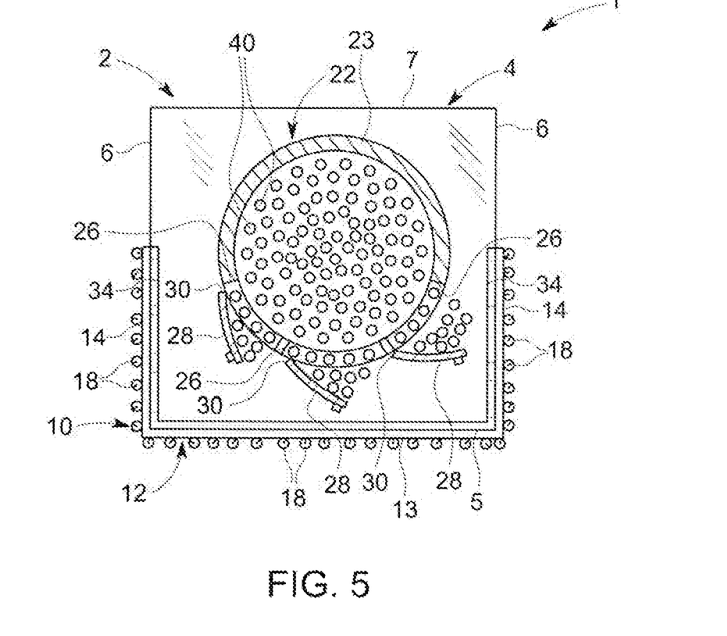
FIG. 5 is a sectional view, taken along section lines 5-5 in FIG. 3, of the illustrative scavenging animal deterring feeder assembly.

The feed-dispensing wildlife feeder 22 may be supported by the stand platform 4 of the feeder support stand 2. The feed-dispensing wildlife feeder 22 may be at least partially enclosed by the stand fence 10. As illustrated in FIG. 5, the wildlife feeder 22 may have a feeder wall 23 which encloses a feeder interior 24. A removable or pivoting feeder lid (not illustrated) may be provided on the upper end of the feeder wall 23 to facilitate opening and closing of the feeder interior 24. At least one feed dispensing opening 26 may extend through the feeder wall 23. At least one feeder door 28 may reversibly close each feed dispensing opening 26. Each feeder door 28 may be pivotally attached to the feeder wall 23 via at least one door hinge 30. As further illustrated in FIG. 5, the feeder interior 24 may be sized and configured to accommodate a supply of animal feed 40 in typical application of the assembly 1, which will be hereinafter described. Upon opening of the feeder door 28, a portion of the animal feed 40 may flow by gravity from the feeder interior 24 through the feed dispensing opening 26 onto the surface of the stand platform 4 for purposes which will be hereinafter described. The feed dispensing opening or openings 26 in the feeder wall 23 may be positioned behind the stand fence 10 such that the animal feed 40 which is dispensed from the wildlife feeder 22 onto the stand platform 4 is at least partially enclosed by the stand fence 10.

The stand platform 4 of the feeder support stand 2 may include a plurality of platform edges 5, 6, 7. The stand fence 10 may extend along at least a portion of at least three of the plurality of platform edges 5, 6, 7. In some embodiments, the stand platform 4 may include a square plate of steel or other metal or material having a size of 2'×2'. Accordingly, the stand platform 4 may have a front platform edge 5, a pair of side platform edges 6 and a rear platform edge 7. The fence frame 12 of the stand fence 10 may include a front frame segment 13 which extends along the front platform edge 5 of the stand platform 4. A pair of side frame segments 14 may extend from opposite ends of the front frame segment 13 along at least a portion of each corresponding side platform edge 6 of the stand platform 4. In some embodiments, the fence frame 12 may additionally include a rear frame segment (not illustrated) which extends along at least a portion of the rear platform edge 7 of the stand platform 4. In some embodiments, the fence frame 12 may be continuous or uninterrupted and may extend along the entire lengths of the front platform edge 5, the side platform edges 6 and the rear platform edge 7 of the stand platform 4. In other embodiments, the stand platform 4 may have other shapes and sizes and the fence frame 12 configured accordingly.

A feeder cover 38 may be provided on the wildlife feeder 22. The feeder cover 38 may protrude forwardly in covering relationship to the portion of the stand platform 4 which extends beneath the feed dispensing openings 26 in the feeder wall 23. Accordingly, the feeder cover 38 may prevent or hinder rain and other precipitation from falling on the animal feed 40 which is dispensed from the feeder interior 24 through the feed dispensing openings 26 onto the stand platform 4 behind the stand fence 10.

Figure 6:
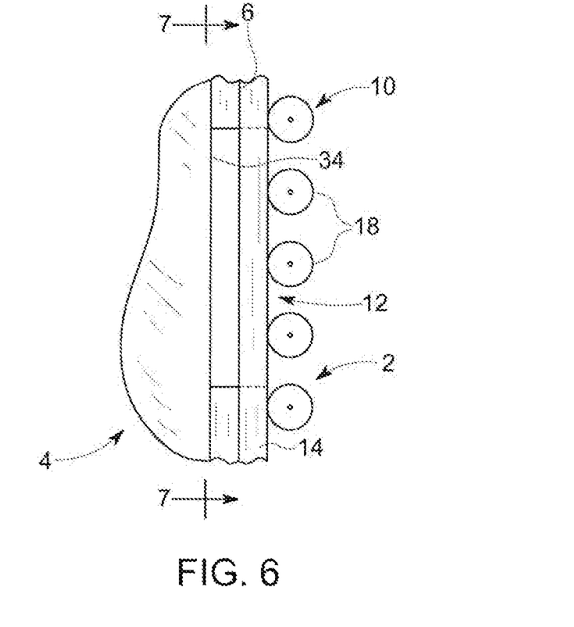
FIG. 6 is an enlarged sectional view, taken along section line 6 in FIG. 5, of a typical stand fence of the assembly.
Figure 7:
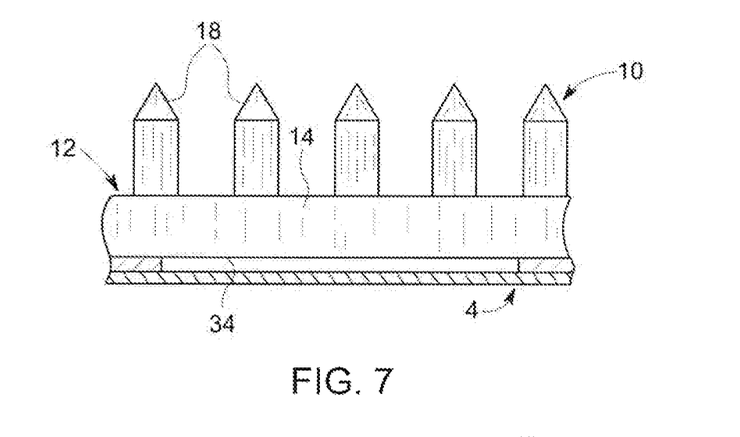
FIG. 7 is a sectional view, taken along section lines 7-7 in FIG. 6, of the stand fence, more particularly illustrating a drain slot extending through the stand fence.
Figure 8:
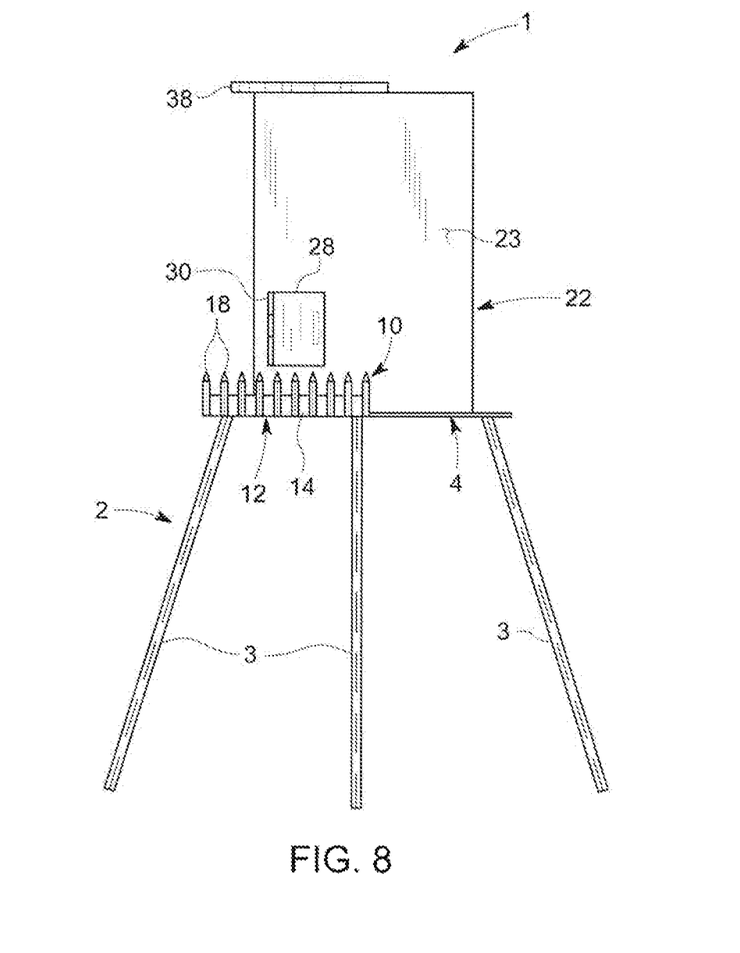
FIG. 8 is a left side view of the illustrative scavenging animal deterring feeder assembly.

As illustrated in FIGS. 5-7, at least one drain slot 34 may extend through the fence frame 12 of the stand fence 10. In some embodiments, a drain slot 34 may extend through each side frame segment 14 of the fence frame 12. The drain slot or slots 34 may facilitate drainage of water or other precipitation from the stand platform 4 through the stand fence 10 to prevent the precipitation from accumulating on the stand platform 4.

The feeder support stand 2 including the stand legs 3, the stand platform 4 and the stand fence 10 may be fabricated of steel, aluminum and/or other metals as well as high-density plastics, composite materials and the like using casting, molding, machining and/or other fabrication techniques known by those skilled in the art. The wildlife feeder 22 may be fabricated of like materials which are consistent with the functional requirements of the assembly 1.

Referring next to FIGS. 5 and 9 of the drawings, in typical application, the assembly 1 may be deployed on the ground or other supporting surface 48 in an area to which deer and/or other wildlife (not illustrated) are to be attracted for hunting, observation and/or other purposes. Accordingly, the stand legs 3 may support the stand platform 4 at the selected elevation above the ground 44. A supply of animal feed 40 (FIG. 5) may be placed in the feeder interior 24 of the wildlife feeder 22. In some embodiments, this may be accomplished by removing the feeder lid (not illustrated) from the upper end of the feeder wall 23, placing the animal feed 40 in the feeder interior 24 and replacing the feeder lid on the feeder wall 23. One or more of the feeder doors 28 may be opened to facilitate gravity flow of a portion of the animal feed 40 from the feeder interior 24 through the corresponding feed dispensing opening 26 and onto the stand platform 4, respectively, inside the stand fence 10, as illustrated in FIG. 5. Accordingly, deer and other wildlife (not illustrated) can access the animal feed 40 for consumption typically by extending the snout over the stand fence 10. The feeder cover 38 on the wildlife feeder 22 may prevent or minimize fall of rain and/or other precipitation onto the animal feed 40 which is dispensed onto the stand platform 4. Any precipitation which falls onto the stand platform 4 may drain from the surface of the stand platform 4 through the drain slot or slots 34 (FIGS. 6 and 7) in the fence frame 12.

As illustrated in FIG. 9, a scavenging animal 42, particularly a wild hog, will attempt to collapse the feeder support stand 2 to access the animal feed 40 which is dispensed onto the stand platform 4, as well as the animal feed 40 which remains in the wildlife feeder 22, typically by standing on its hind legs 43 and forcefully moving and landing its front paws 44 downwardly against the stand platform 4. However, the upward-standing fence spikes 18 on the stand fence 10 deter the scavenging animal 42 from landing its front paws 44 onto the platform 4. Consequently, the animal feed 40 remains undisturbed and can be consumed by the wildlife as they are attracted to the area in which the wildlife feeder 22 is deployed.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A scavenging animal deterring feeder assembly, comprising:
    a feeder support stand including:
        an elevated stand platform; and
        a stand fence having a plurality of spaced-apart, upward-standing fence spikes carried by the stand platform;
    a feed-dispensing wildlife feeder carried by the stand platform of the feeder support stand and at least partially enclosed by the stand fence, and
    wherein the stand platform comprises a plurality of platform edges, and the stand fence extends along at least a portion of at least three of the plurality of platform edges.

2. The scavenging animal deterring feeder assembly of claim 1 wherein the feeder support stand comprises at least one stand leg, and the elevated stand platform is carried by the at least one stand leg.

3. The scavenging animal deterring feeder assembly of claim 1 wherein the stand fence comprises a fence frame and the fence spikes are carried by the fence frame.

4. The scavenging animal deterring feeder assembly of claim/wherein the stand platform comprises a front platform edge and a pair of side platform edges extending from the front platform edge, and the fence frame of the stand fence comprises a front frame segment extending along the front platform edge and a pair of side frame segments extending along at least a portion of the side platform edges, respectively, of the stand platform.

5. The scavenging animal deterring feeder assembly of claim 1 wherein the feed-dispensing wildlife feeder comprises a feeder wall, a feeder interior formed by the feeder wall and at least one feed dispensing opening in the feeder wall.

6. The scavenging animal deterring feeder assembly of claim 5, further comprising at least one feeder door carried by the feeder wall, the at least one feeder door configured to reversibly close the at least one feed dispensing opening.

7. The scavenging animal deterring feeder assembly of claim 1 further comprising a feeder cover carried by the feed-dispensing wildlife feeder.

8. A scavenging animal deterring feeder assembly, comprising:
    a feeder support stand including:
        an elevated, generally rectangular stand platform having a front platform edge, a pair of side platform edges and a rear platform edge; and
        a stand fence having:
            a fence frame upward standing from the stand platform, the fence frame extending at least along the front platform edge and at least a portion of the pair of side platform edges, respectively, of the stand platform; and
            a plurality of spaced-apart, upward-standing fence spikes carried by the fence frame; and
    a feed-dispensing wildlife feeder carried by the stand platform of the feeder support stand and at least partially enclosed by the stand fence.

9. The scavenging animal deterring feeder assembly of claim 8 wherein the feeder support stand comprises at least one stand leg, and the stand platform is carried by the at least one stand leg.

10. The scavenging animal deterring feeder assembly of claim 8 further comprising at least one drain slot in the fence frame of the stand fence.

11. The scavenging animal deterring feeder assembly of claim 8 wherein the fence frame of the stand fence comprises a front frame segment extending along the front platform edge and a pair of side frame segments extending along at least a portion of the side platform edges, respectively, of the stand platform.

12. The scavenging animal deterring feeder assembly of claim 11, further comprising a pair of drain slots in the side frame segments, respectively, of the fence frame.

13. The scavenging animal deterring feeder assembly of claim 8 wherein the feed-dispensing wildlife feeder comprises a feeder wall, a feeder interior formed by the feeder wall and at least one feed dispensing opening in the feeder wall.

14. The scavenging animal deterring feeder assembly of claim 13 further comprising at least one feeder door carried by the feeder wall, the at least one feeder door configured to reversibly close the at least one feed dispensing opening.

15. The scavenging animal deterring feeder assembly of claim 8 further comprising a feeder cover carried by the feed-dispensing wildlife feeder.

16. A scavenging animal deterring feeder assembly, comprising:
    a feeder support stand including:
        a plurality of stand legs;
        an elevated, generally rectangular stand platform carried by the plurality of stand legs, the stand platform having a front platform edge, a pair of side platform edges and a rear platform edge; and
        a stand fence having:
            a fence frame upward standing from the stand platform, the fence frame including a front frame segment extending along the front platform edge and a pair of side frame segments extending along at least a portion of the side platform edges, respectively, of the stand platform:
            a plurality of spaced-apart, upward-standing fence spikes carried by the fence frame; and
            at least one drain slot in the fence frame; and
    a feed-dispensing wildlife feeder carried by the stand platform of the feeder support stand and at least partially enclosed by the stand fence.

17. The scavenging animal deterring feeder of claim 16 wherein the feed-dispensing wildlife feeder comprises a feeder wall, a feeder interior formed by the feeder wall and at least one feed dispensing opening in the feeder wall.

18. The scavenging animal deterring feeder assembly of claim 17 further comprising at least one feeder door carried by the feeder wall, the at least one feeder door configured to reversibly close the at least one feed dispensing opening.

19. The scavenging animal deterring feeder assembly of claim 16 further comprising a feeder cover carried by the feed-dispensing feeder.

\* \* \* \* \*